US010736201B2

(12) United States Patent
Burchardt et al.

(10) Patent No.: US 10,736,201 B2
(45) Date of Patent: Aug. 4, 2020

(54) DRIVER APPARATUS

(71) Applicant: PURELIFI LIMITED, Edinburgh (GB)

(72) Inventors: Harald Burchardt, Edinburgh (GB); Dobroslav Tsonev, Edinburgh (GB); Steven Ritchie, Edinburgh (GB); Arne Rossius, Edinburgh (GB)

(73) Assignee: pureLiFi Limited, Edinburgh (GB)

( * ) Notice: Subject to any disclaimer, the term of this patent is extended or adjusted under 35 U.S.C. 154(b) by 0 days.

(21) Appl. No.: 16/084,405

(22) PCT Filed: Mar. 10, 2017

(86) PCT No.: PCT/GB2017/050641
§ 371 (c)(1),
(2) Date: Sep. 12, 2018

(87) PCT Pub. No.: WO2017/158323
PCT Pub. Date: Sep. 21, 2017

(65) Prior Publication Data
US 2019/0082521 A1    Mar. 14, 2019

(30) Foreign Application Priority Data

Mar. 15, 2016  (GB) .................................. 1604402.6

(51) Int. Cl.
*H05B 33/08*    (2020.01)
*H05B 47/19*    (2020.01)
(Continued)

(52) U.S. Cl.
CPC ............. *H05B 47/19* (2020.01); *H05B 45/10* (2020.01); *H05B 45/395* (2020.01)

(58) Field of Classification Search
CPC ............ H05B 33/0909; H05B 33/0815; H05B 33/0845; H05B 33/0851; H05B 37/0227; H05B 37/0272
(Continued)

(56) References Cited

U.S. PATENT DOCUMENTS 8,975,825 B2    3/2015  Hu
2007/0045524 A1*  3/2007  Rains, Jr. .................. F21S 2/00
                                                        250/228

(Continued)

FOREIGN PATENT DOCUMENTS

EP        0584013      2/1994
WO     2011141768     11/2011
(Continued)

OTHER PUBLICATIONS

Bruensteiner et al. "3.3-V CMOS Pre-Equalization VCSEL Transmitter for Gigabit Multimode Fiber Links" IEEE Photonics Technology Letters, 11(10):1301-1303 (1999).
(Continued)

*Primary Examiner* — Tung X Le
(74) *Attorney, Agent, or Firm* — Myers Bigel, P.A.

(57) ABSTRACT

A luminaire driver apparatus for use with one or more light emitting diodes or other light sources, comprises voltage control circuitry configured to regulate a supply voltage to one or more light emitting diodes or other light sources; driving circuitry configured to provide a drive current to the one or more light emitting diodes or other light sources, the drive current being dependent on the supply voltage, wherein the driving circuitry is configured to modulate the drive current based on a modulated drive signal such that the one or more light emitting diodes or other light sources produces an optical signal, wherein at least one of the driving circuitry and control circuitry are operable to adapt
(Continued)

to a plurality of different types of light emitting diode or other light source. Thereby providing a universal driver function.

28 Claims, 4 Drawing Sheets

(51) Int. Cl.
*H05B 45/10* (2020.01)
*H05B 45/395* (2020.01)

(58) Field of Classification Search
USPC .......................... 315/297, 307, 312
See application file for complete search history.

(56) References Cited

U.S. PATENT DOCUMENTS

| | | | |
|---|---|---|---|
| 2007/0109763 A1* | 5/2007 | Wolf | A01M 1/2083 |
| | | | 362/86 |
| 2007/0195025 A1 | 8/2007 | Korcharz et al. | |
| 2009/0079360 A1 | 3/2009 | Shteynberg et al. | |
| 2010/0142965 A1 | 6/2010 | Breyer et al. | |
| 2011/0080117 A1 | 4/2011 | Peker et al. | |
| 2011/0266959 A1* | 11/2011 | Taipale | H05B 35/00 |
| | | | 315/182 |
| 2014/0197754 A1* | 7/2014 | Wray | H05B 45/40 |
| | | | 315/217 |
| 2016/0198546 A1* | 7/2016 | Chen | G08B 15/00 |
| | | | 315/159 |

FOREIGN PATENT DOCUMENTS

| | | |
|---|---|---|
| WO | 2012052935 | 4/2012 |
| WO | 2016014957 | 1/2016 |

OTHER PUBLICATIONS

Chun et al. "A Study of Illumination and Communication using Organic Light Emitting Diodes" Journal of Lightwave Technology, 31(22):3511-3517 (2013).

El Said et al. "An Electrically Pre-Equalized 10-Gb/s Duobinary Transmission System" Journal of Lightwave Technology, 23(1):388-400 (2005).

International Search Report and the Written Opinion of the International Searching Authority corresponding to International Patent Application No. PCT/GB2017/050641 (13 pages) (dated Jun. 7, 2017).

Tsonev et al. "A 3-Gb/s Single-LED OFDM-Based Wireless VLC Link Using a Gallium Nitride µLED" IEEE Photonics Technology Letters, 26(7):637-640 (2014).

Zeng et al. "Equalisation for High-Speed Visible Light Communications using White-LEDs" IEEE Proceedings, pp. 170-173, CNSDSP (2008).

\* cited by examiner

DRIVER APPARATUS

CROSS REFERENCE TO RELATED APPLICATIONS

This application is a 35 U.S.C. § 371 national stage application of PCT International Application No. PCT/GB2017/050641, filed on Mar. 10, 2017, which claims priority from Great Britain Patent Application No. 1604402.6, filed on Mar. 15, 2016, the contents of which are incorporated herein by reference in their entireties. The above-referenced PCT International Application was published in the English language as International Publication No. WO 2017/158323 A1 on Sep. 21, 2017.

FIELD

The present invention relates to driver apparatus, for instance a universal luminaire driver.

BACKGROUND

A wide range of different types of light-emitting diodes (LEDs) exist on the market and are available "off-the-shelf". Each type of LED has a set of operating conditions defined, for example, by the minimum and maximum values of voltage and current for which the LED will operate correctly. Each type of LED also has a set of intrinsic performance characteristics, for example, an achievable light intensity of light produced by the LED. This is relevant when used in the context of optical light communication. Other intrinsic performance characteristics of LEDs are also relevant in such a context. For example, LEDs have an intrinsic modulation frequency bandwidth dependent on the method of manufacture and the materials the LED is made of. For example, Organic Light Emitting Diodes (OLEDs) typically have a low modulation frequency bandwidth in the region of hundreds of kilohertz. However, solid-state LEDs typically have higher modulation bandwidth in the region of several megahertz.

Luminaires for optical light communication are designed to serve a specific purpose. The design of a driver circuit of the luminaire may be tailored to incorporate a specific type and/or number of LEDs. In particular, the driving circuit may be tailored to the operating conditions of the LED to provide good performance. The driving circuit can also be tailored to one or more LEDs to provide improved performance compared to the individual intrinsic performance characteristics of the individual LED.

In general, a bespoke driving circuit tailored to a specific type of LED may not be suitable for use with a different type of LED. Reasons for unsuitability include the bespoke driving circuit being set to provide a voltage and/or current that is insufficient for the chosen type of LED, in effect leading to a reduced quality optical signal. The performance of other components in the driving circuit are also dependent on the type of LED connected to the driving circuit and using an LED type other than the type for which the driving circuit was tailored can lead to inefficiency in the operation of the LED and the other component parts. For example, if a component of a driving circuit is a transistor, the use of an LED that requires different voltage levels to operate in the same current signal range may cause the transistor to dissipate unnecessarily high thermal energy levels leading to inefficiency in the driving circuit. Transistors are also built with a finite tolerance to voltage drop before the transistor is destroyed. Therefore, connecting a different type of LED carries the risk of destroying the transistor.

As is known, visible light communication uses intensity modulation of LEDs. An intrinsic property of LEDs is their response to an input current, which varies from LED to LED and can be characterised using a frequency modulation bandwidth. A different type of LED connected to a tailored LED driver may not be able to provide a sufficient quality of signal, as measured by a signal to noise ratio, over the full modulation bandwidth originally intended.

SUMMARY

According to a first aspect of the present invention, there is provided a luminaire driver apparatus for use with one or more light emitting diodes or other light sources, comprising: voltage control circuitry configured to regulate a supply voltage to one or more light emitting diodes or other light sources; driving circuitry configured to provide a drive current to the one or more light emitting diodes or other light sources, the drive current being dependent on the supply voltage, wherein the driving circuitry is configured to modulate the drive current based on a modulated drive signal such that the one or more light emitting diodes or other light sources produces an optical signal, wherein at least one of the driving circuitry and control circuitry are operable to adapt to a plurality of different types of light emitting diode or other light source.

The plurality of different types of light emitting diode or other light sources may comprise light emitting diodes or other light sources that have at least one of different minimum and/or maximum operating current and/or voltage levels, different modulation frequency bandwidths, different optical response to input current. The modulated drive signal may be such as to modulate the optical signal to represent data for example data of an input information signal.

The control circuitry may comprise monitoring means configured to monitor a parameter of the driving circuit wherein the parameter is representative of the operation of the light emitting diode or other light source. The control circuitry may be further configured to automatically adjust the supply voltage to the one or more light emitting diodes or other light sources based on the monitored parameter.

The modulated drive signal may comprise a range of values and the automatic adjustment of the supply voltage may permit operation of the light emitting diode over said range of values. The supply voltage may be selected to permit operation of the light emitting diode in a linear region of an optical power output to current input curve of the light emitting diode.

The automatic adjustment of the voltage supply to the light emitting diode or other light source may maintain the monitored parameter at a predetermined value or within a predetermined range or at a minimum value, optionally thereby to reduce power consumption of components of the driving circuitry.

The automatic adjustment of the voltage supply to the light emitting diode may maintain the monitored parameter at an extreme value to reduce power consumption of components of the driving circuitry.

The driving circuitry may comprise a transistor or other current and/or voltage regulating component, configured to control the drive current using the drive signal and the monitored parameter of the driving circuitry may be representative of or dependent on an input or output voltage of the transistor or other current and/or voltage regulating component. The monitored parameter may be maintained at the predetermined value or within the predetermined range or at the minimum value thereby to reduce voltage drop across the transistor or other current and/or voltage regulating component.

The driving circuitry of the luminaire may comprise compensating means configured to at least partially reduce distortion to the optical signal produced by the one or more light emitting diodes or other light sources.

The compensating means may be further configured to at least partially reduce a contribution to the distortion to the optical signal from a response of the one or more light emitting diodes or other light sources to the drive signal. The optical signal may be conveyed through a free-space communication channel to a receiver and the compensating means may be further configured to at least partially reduce a contribution to the distortion to the optical signal from the free-space communication channel. The distortion of the optical signal can be represented by a deformation in a shape of the optical signal and the compensating means is configured to manipulate the drive signal to at least partially reduce said deformation to the shape of the optical signal.

The compensating means of the luminaire may comprise at least one of pre-distortion circuitry, pre-equalisation circuitry or pre-coding circuitry. Alternatively, the compensating means may be configured to carry out adaptive bit and energy loading.

The compensating means may comprise one or more digital and/or analogue filters. The coefficients representing the filters may be pre-determined. The coefficients may be adapted to the received signal using channel state information. The pre-coding (e.g. pre-distortion) step may be a transformation on the or an information signal which reduces the peakiness of the signal distribution and, hence, reduces the peak-to-average power ratio (PAPR) of the information signal. It may also be a processing step which inverts a non-linear input-output characteristic of an LED or other light source in order to reduce the non-linear distortion which leads to performance degradation. The compensating means may apply any suitable pre-coding/pre-distortion techniques.

The compensating means may be configured to operate in a frequency domain or a time domain The types of light emitting diode used with the luminaire may for example have an intrinsic optical modulation bandwidth below 1 MHz, or below 2 MHz, or below 10 MHz. The types of LED may be one of phosphor converted LED, multi-chip LED, micro LED and resonant cavity LED.

The light and/or optical signals may comprise electromagnetic waves with wavelengths in the range 1 nm to 2500 nm. The light and/or optical signals may comprise ultraviolet, visible light, near-infrared light or THz radiation. The luminaire driver apparatus may be configured for optical wireless communication and/or may form part of an optical wireless communication system.

The drive signal may be modulated using at least one of a single carrier modulation scheme, a multi-carrier modulation scheme and a carrier-less modulation scheme.

In a further aspect of the invention there is provided apparatus comprising at least one light source, a luminaire driver apparatus as claimed or described herein, and a power source providing a supply voltage and/or drive current.

In another aspect of the invention there is provided a method of operating at least one light source comprising installing at least one light source in a luminaire driver apparatus as claimed or described herein, and operating at least one of the driving circuitry and control circuitry to adapt to the light source.

BRIEF DESCRIPTION OF THE DRAWINGS

Various aspects of the invention will now be described by way of example only, and with reference to the accompanying drawings, of which.

DETAILED DESCRIPTION OF THE DRAWINGS

Figure 1:
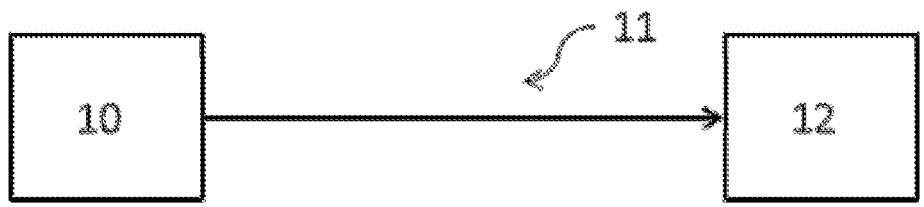
FIG. 1 is a block diagram of an optical communication system.

FIG. 1 shows a schematic block diagram illustrating the principles of optical wireless communication. A transmitter 10 is configured to send an optical signal in which information is encoded through an optical communication channel 11 to a receiver 12. The optical communication channel 11 may be a free-space communication channel. A driving circuit to drive an LED to produce the optical signal containing encoded information is also provided, together with a photo-diode to receive the optical signal and circuitry/processor to process the received signal.

The physical limitation of the LED due to its frequency response to a drive current is a significant contribution to distortion of an optical signal (e.g. a reduction in the signal to noise ratio of an optical signal) in an optical light communication channel formed between a transmitter and a receiver. Frequency response of the channel itself can also be measured. A non-flat communication channel between the transmitter and receiver may, for example, be caused by multiple copies of the same optical signal arriving at different points in time at the receiver.

It can be useful to model an LED as a low pass filter. The LED is characterised by a modulation frequency response in the frequency domain (and equivalently by an impulse response in the time domain). Gain at a given modulation frequency can be defined as the ratio of optical power at that frequency to optical power at a reference modulation frequency. The reference modulation frequency may be chosen such that the optical power at the reference modulation frequency is a maximum value and/or such that the reference modulation frequency is zero. Above a certain modulation frequency the gain of the LED will be less than a certain threshold. Typically this threshold is chosen to be negative 3 dB. A gain of more than negative 3 dB corresponds to an attenuation of less that positive 3 dB. A gain at an upper bandwidth modulation frequency of negative 3 dB corresponds to a halving of the optical signal variance at the upper bandwidth modulation frequency. This value typically depends on the injected carrier lifetime of the LED and the parasitic capacitance of the LED.

Figure 2:
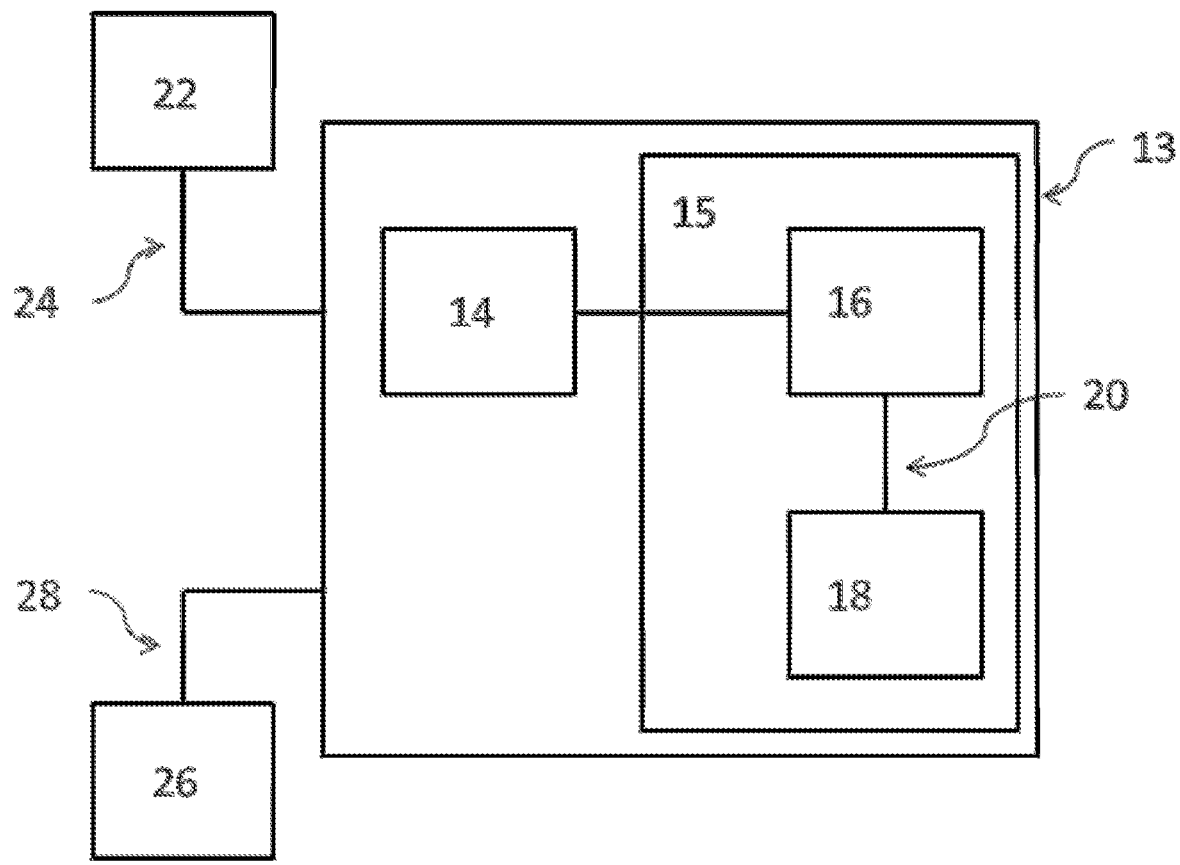
FIG. 2 is a block diagram of a luminaire.

FIG. 2 shows a high level block diagram of a Universal Luminaire Driver for optical communication. The luminaire 13 has control circuitry 14 and driving circuitry 15. The driving circuitry 15 has two modules: a light emitting diode circuit module 16 and a signal circuit module 18. The light emitting diode circuit module 16 is adapted such that one or more light emitting diodes can be connected to the luminaire. An interface 20 is provided between the light emitting diode circuit module 16 and the signal circuit module 18.

The luminaire 13 can be used with one or more light emitting diodes of different types. The luminaire 13 is connected to a power source 22 by a power connection 24 and to a network infrastructure 26 through a network connection 28.

The power source 22 can be a standard power supply unit. The power source 22 can provide different voltage levels to luminaire 13 through the power connection 24. Each of the different voltage levels can be present in one or more wires of the power connection 24. The different voltage levels provided may be referred to as voltage rails. Different components of the luminaire 13 may use different voltage levels in accordance with the requirements of the component.

For example, a first voltage rail at a first voltage level may be provided to the light emitting diode circuit module 16 and a second voltage rail at a second voltage level may be provided to the signal circuit module 18. In particular, the light emitting diode circuit module 16 must provide a sufficient voltage level to power a connected light emitting diode and is therefore likely to require a different voltage level than component parts of the signal circuit module 18.

The control circuitry 14 is connected to the light emitting diode circuit module 16 and to the voltage rail provided to the light emitting diode circuit module 16. The control circuitry 14 is configured to control the voltage rail provided to the light emitting diode circuit module 16. The operation of the control circuitry 14 is explained in more detail with reference to FIG. 3 and FIG. 4.

The signal circuit module 18 is configured to provide a drive signal to the light emitting diode circuit module 16, thereby allowing an optical signal to be produced. By manipulating the drive current, the signal circuit module 18 can compensate, and at least partially reduce any distortion in the optical signal originating from the light emitting diode circuit module 16 or from a free-space communication channel. Distortion may be present because the connected LED is not capable of achieving modulation frequencies required. The signal circuit module 18 is described in more detail with reference to FIG. 5, FIG. 6 and FIG. 7.

Figure 3:
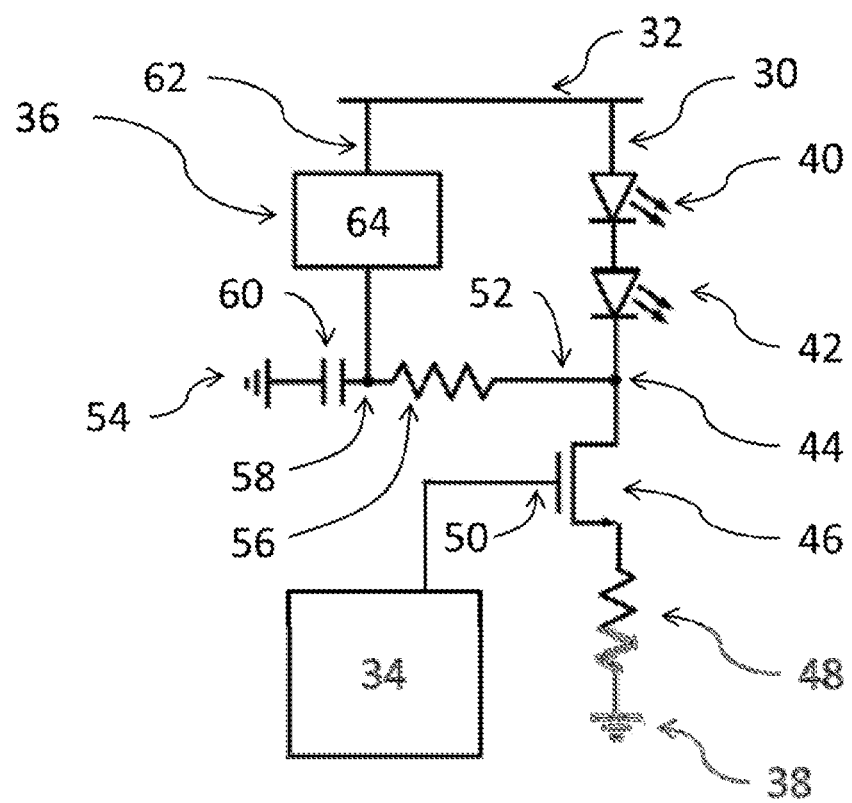
FIG. 3 is a circuit diagram of an aspect of the luminaire.

FIG. 3 shows an illustrative embodiment of driving circuitry and control circuitry. The driving circuitry has a LED circuit line 30 connected to a voltage supply line 32, and additional signal circuitry 34. The control circuitry is represented by a control circuit 36 connected between the LED circuit line 30 and the voltage supply line 32.

The LED circuit line 30 extends between, and is connected to, the voltage supply line 32 at a first end and an earth ground 38 at a second end. Traversing the LED circuit line 30 in the direction from the voltage supply end to the earth ground end, the LED circuit line 30 has the following connected components: a first LED 40, a second LED 42, a control circuit connection 44, a transistor 46 and a resistor 48. The control circuit connection 44 provides a connection between the control circuit 36 and the LED circuit line 30. In alternative embodiments the apparatus may be configured for installation of any suitable number of LEDs, for example a single LED or any other suitable number of LEDs, and embodiments are not limited to the two LED arrangement shown in FIG. 3. The LEDs may be arranged in series or in parallel.

The transistor 46 provides an interface between the LED circuit line 30 and the additional signal circuitry 34. The transistor 46 shown is a single metal-oxide semi-conductor field-effect-transistor (MOSFET). However, different transistor technology can be used. The transistor 46 has three terminals: a gate terminal, a drain terminal and a source terminal. The transistor 46 is configured in the circuit such that the signal circuitry 34 is connected to the gate terminal to provide a drive signal 50 to the transistor 46. The gate and source terminals are connected across the LED circuit line 30 such that the connection between the drain and source terminals in the transistor 46 forms part of the LED circuit line 30. The transistor 46 is oriented such that the drain terminal is on the voltage supply line 32 side of the LED circuit line 30 and the source terminal is on the earth ground 38 side of the LED circuit line 30.

Turning to the control circuit 36, FIG. 3 shows a first control circuit line 52 that connects at a first end to the LED circuit line 30 and at a second end to a second earth ground point 54. The connection at the first end of the first control circuit line 52 is the control circuit connection 44 of the LED circuit line 30. Traversing the first control circuit line 52 from the control circuit connection 44 to the second earth ground point 54 the following components are connected: a control circuit resistor 56, a control circuit junction 58 and a control circuit capacitor 60. Together the control circuit capacitor 60 and the control circuit resistor 56 provide a simple RC filter for a signal in the first control circuit line 52. A second control circuit line 62 connects the first control circuit line 52 to the voltage supply line 32. The second control circuit line 62 connects to the first control circuit line 52 at the control circuit junction 58 which is located between the control circuit resistor 56 and the control circuit capacitor 60. Connected on the second control circuit line 62 is a voltage control circuit 64 which is described with reference to FIG. 4.

The signal circuitry 34 is configured to provide the drive signal 50 to the gate of transistor 46 to control the current in the LED circuit line 30. Control of the current includes controlling the magnitude of the current. The drive signal 50 has a voltage value of $V_{in}$. The drive signal 50 is modulated and contains a DC component and an AC component. The DC component sets the operating point of the device (the DC bias of the drive current through the LED). The AC component corresponds to the modulation of the signal and varies the current provided to the LEDs. Generation of the drive signal is discussed in more detail with reference to FIGS. 5 to 7.

A non-zero value of the voltage rail provides a voltage difference between the voltage supply line 32 and earth ground 38. If the voltage difference over each one of the LEDs is high enough, the voltage difference allows a drive current to flow through the LED circuit line 30. The drive current flows through the resistor 48 which has a resistance (R). The resistor 48 can be chosen to stabilize the drive current flowing through the LEDs. The transistor 46 operates to control this current flow and can be considered as providing a voltage controlled current source. When a gate voltage is supplied to the transistor 46 with a voltage that is higher than the value of the source voltage then the transistor 46 acts like a variable resistor between the drain and source terminals. In this case, the resistance between the drain and source terminals varies with the voltage difference between the gate and source terminals. By providing a voltage to the transistor 46, the resistance provided by the transistor on the LED circuit line 30 also varies. For a given value of the gate voltage there is a corresponding value of the drive current in the LED circuit line 30. This current flows and is delivered to the first LED 40 and the second LED 42.

For a given value $I_{LED}$ in the LED circuit line 30 corresponding to an input voltage to the transistor 46, the voltage at different points of the LED circuit line 30 have different values. Of particular interest are the values of the voltage over the resistor 48, the voltage over the LEDs and the voltage over the transistor 46.

For a given value of drive current, $I_{LED}$ the voltage over the resistor 48 is: $V_R=I_{LED} R$. For this same value of current, the voltage over each LED will correspond to an intrinsic voltage-current characteristic of each LED. The relationship between voltage and current for each LED can be represented as a function which may be approximately an exponential function: e.g. current is approximately an exponential function of voltage. A small change to the voltage across the LED can therefore result in a large change in current through the LED. In addition, each LED has an intrinsic threshold characteristic. This can be represented in a current-voltage function as a threshold point corresponding to a threshold voltage value. A voltage across the LED below the threshold voltage value will correspond to no current flowing through the LED and hence a LED will not produce any light at this voltage value. The voltage over the transistor 46 typically requires a low positive value to allow a current to flow through transistor 46. A relationship between power or intensity of a generated optical output of an LED and current input to the LED can be represented as a function or as an optical output to current input curve. The luminaire may be configured such that operation is in a linear region of this curve.

The voltage over the transistor (between the source and drain terminals) is equal to the difference of the voltage at the drain terminal and the value of the voltage at the source terminal. The voltage on the drain side of transistor 46 is monitored at the point of the control circuit connection 44 that connects the first control circuit line 52 to the LED circuit line 30. This voltage is $V_{monitor}$. Since the voltage on the source side is determined by the resistor 48 then the value for a given current $I_{LED}$ is $V_R=I_{LED} R$. The voltage across the transistor is therefore equal to $V_{monitor}-V_R$. The gate voltage regulates the current through the transistor 46. Therefore the value of $V_{monitor}$ does not have an influence on the value of the current in the LED circuit line 30. In practice, $V_{monitor}$ has at negligible effect as the MOSFET acts as a current source with very high output impedance.

$V_{monitor}$ is indicative of the operating conditions of the luminaire. For example, for a constant value of voltage in the voltage supply line 32 different types of LED with different voltage drop characteristics will provide different values of $V_{monitor}$. In addition, since the voltage over the transistor 46 is dependent on it, $V_{monitor}$ is also indicative of the operating conditions of other components in the circuit. $V_{monitor}$ should be kept as low as possible to prevent inefficient power dissipation over the transistor. The power dissipation can be calculated using the relationship Power=Voltage×Current. Excessively high thermal energy levels may be dissipated. Furthermore, transistors are manufactured to tolerate only a limited voltage drop. Applying a voltage above this tolerance will result in the transistor being destroyed.

Since the drive signal 50 has an AC component and varies the drive current in the LED circuit line 30 then the value of $V_{monitor}$ is also alternating and has a characterising frequency. The control circuit resistor 56 and the control circuit capacitor 60 are connected in series along the first control circuit line 52 and act together as a simple RC filter for $V_{monitor}$. The voltage can be considered as split between the control circuit resistor 56 and the control circuit capacitor 60, where the voltage over the control circuit capacitor 60 is input to the voltage control circuit 64. This configuration provides a low-pass filter for $V_{monitor}$ from the LED circuit line 30. High frequency signals are attenuated e.g. shorted to second earth ground point 54 by the capacitor and low frequency signals are passed. The RC filter therefore acts to provide a low frequency (average DC) voltage of the transistor drain to the voltage control circuit 64. The cut-off frequency of the RC filter, above which no signals pass, will depend on the filter design and choice of components e.g. capacitance and resistance of the components.

Figure 4:
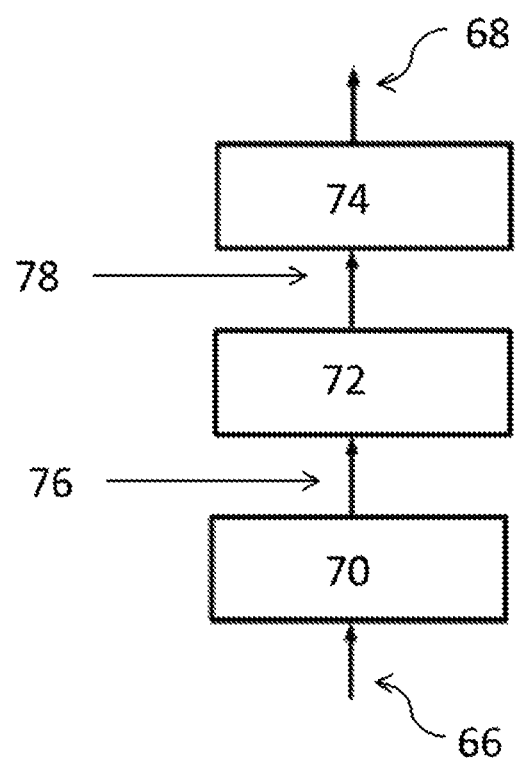
FIG. 4 is a block diagram of a voltage control circuit.

FIG. 4 is a block diagram showing an example implementation of the voltage control circuit 64. The voltage control circuit 64 is a DC supply circuit. The example implementation shown is a digital embodiment but this is just one possibility for realizing the voltage control circuitry. The voltage control circuitry takes an input signal 66 and returns an output signal 68. The voltage control circuitry has several component parts: an analogue-to-digital converter 70, a digital control logic component 72, and a digitally-controlled DC to AC converter 74.

The input signal 66 is an analogue signal and is converted to a digital signal 76 by the analogue-to-digital converter 70. The digital signal 76 then passes to the digital control logic component 72. The digital control logic component 72 assesses the digital signal 76 and produces digital instructions 78. The digital instructions 78 are then converted to the output signal 68 by the digitally-controlled DC to AC converter 74. The input signal 66 corresponds to a filtered or averaged voltage from the control circuit connection 44 and the output signal 68 sets the rail voltage of the voltage supply line 32.

In use, with reference to FIG. 3 and FIG. 4, different types of LED can be connected to the luminaire via the LED circuit line 30. The LED is simply plugged into the luminaire. These types of LEDs will have different operating conditions that need to be satisfied in order to operate in their desired performance range. After an LED is connected, the luminaire operates as follows. A modulated drive signal 50 is provided to the transistor 46 which acts as a voltage controlled current source. The modulated drive signal 50 controls the drive current in the LED circuit line 30 provided to the connected LED through the transistor 46. A value based on $V_{monitor}$ is recorded by the control circuit 36. Variation in the drive current causes a variation in $V_{monitor}$. $V_{monitor}$ is also dependent on the value of the voltage of the voltage supply line 32. An analogue input signal is provided to the voltage control circuit 64 based on an average value of $V_{monitor}$ that is determined by a filtering of $V_{monitor}$. The digital control logic component 72 is configured to determine a minimum value of the $V_{monitor}$ that corresponds to fully operational conditions of the attached LED. That minimum value is encoded into a set of digital instructions 78 that is then converted to the analogue output signal 68 that sets the voltage of the voltage supply line 32. The process will automatically set the correct voltage for the attached type or types of LED and thereby regulates the voltage supplied to the one or more LEDs.

As an example, if the voltage supply line 32 initially provides a voltage that is below threshold for the given type of attached LED, then the LED will effectively stop conducting. Aside from a small leakage current no current will flow when the LED is attached. $V_{monitor}$ will reflect that no current, aside from a small leakage current, is flowing through the LED. In this case, the voltage control circuit 64 is configured to automatically adjust the voltage of the voltage supply line 32 to increase voltage above threshold.

Another example occurs when the voltage supply line 32 initially provides a voltage that is dangerously high for the operation of the transistor 46. $V_{monitor}$ will register a high value. In this case, the voltage control circuit 64 is configured to automatically adjust the voltage of the voltage supply line 32 to decrease the voltage to below a level that is dangerous to the transistor.

The adjustment made by the voltage control circuit 64 may be based on iterative steps of registering a value for $V_{monitor}$ and updating the voltage supply line 32 voltage based on $V_{monitor}$. In addition, a continuous monitoring of $V_{monitor}$ can be provided during real time operation of the luminaire. This is particularly advantageous as operational characteristics of the LED and other components in the luminaire that have an effect on $V_{monitor}$ can be dependent on environmental factors, for example temperature changes. Continuous and automatic adjustment of $V_{monitor}$ allows the luminaire to adjust to temperature changes in the environment.

As described above, the drive signal 50 of the signal circuitry 34 controls the drive current provided to the LEDs. Different types of LED connected to the LED circuit line 30 will respond differently to the drive current. A new type of LED connected to the luminaire may be able to operate in accordance to its voltage and current requirements due to the control circuit. However, the drive signal itself may contain portions at modulation frequencies that are beyond the physical capabilities of the LED i.e. the LED cannot broadcast an optical signal over the full range of modulation frequencies required without significant reduction in the signal to noise ratio of the information signal received at the receiver.

Therefore, to adapt to different types of LED the luminaire may be capable of compensating for any physical distortion in the communication channel between the transmitter and the receiver caused by the LED. Compensating means is included in the driving circuitry to modify the drive signal.

Figure 6:
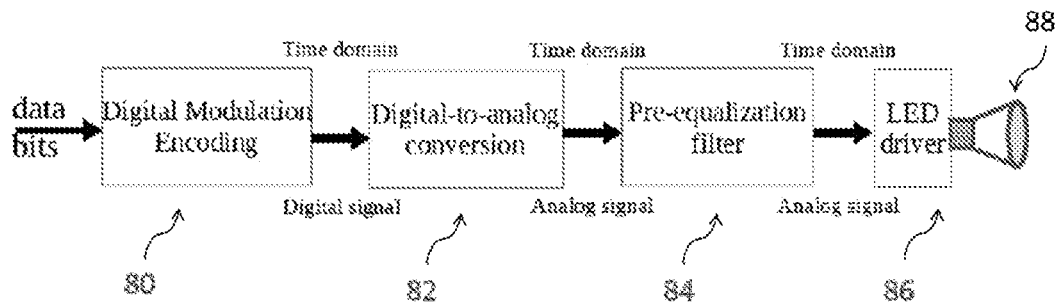
FIG. 6 is a block diagram of a part of driving circuitry of a luminaire.
Figure 5:
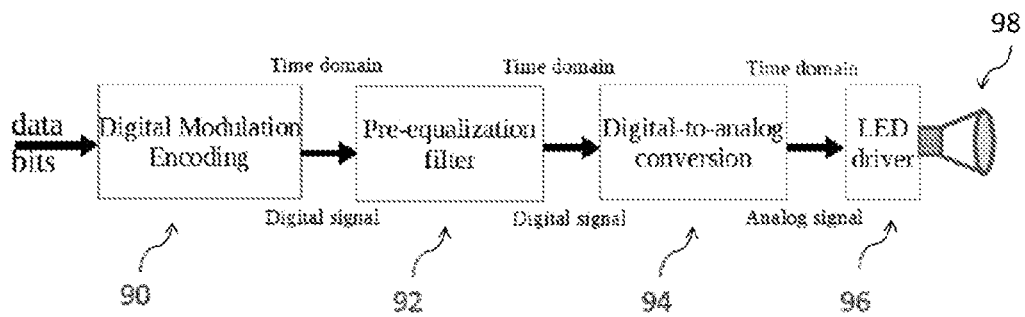
FIG. 5 is a block diagram of a part of driving circuitry of a luminaire.
Figure 7:
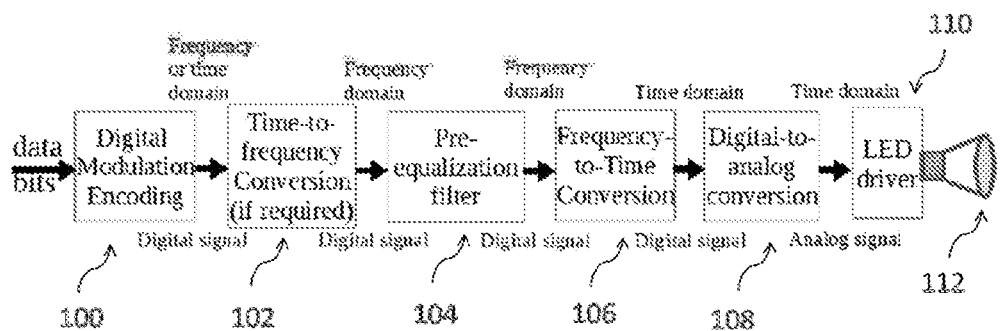
FIG. 7 is a block diagram of a part of driving circuitry of a luminaire.

Several examples of signal generating circuitry configured to compensate for distortion in the LED are shown in FIGS. 5 to 7. Firstly, FIG. 5 is a block diagram of an embodiment of signal generating circuitry comprising: a digital modulation encoding module 90, a pre-equalisation filter 92, a digital-to-analogue converter 94, a LED driver circuit 96 and an LED 98.

An input information signal comprises data in the form of bits. The information signal may originate from a processor or external network. This information signal is modulated into a digital signal using any suitable modulation scheme by the digital modulation encoding module 90. Suitable modulation schemes include single carrier modulation schemes, for example: on-off keying (OOK), pulse position modulation (PPM), pulse amplitude modulation (PAM). Multi-carrier modulation schemes can also be used, for example: orthogonal frequency division multiplexing. Carrier-less amplitude and phase modulation is also suitable.

The pre-equalisation filter 842 is a digital filter applied directed to the digital signal output of the digital modulation encoding module 80. The output from the pre-equalisation filter is a digital signal. The digital signal is converted to an analogue signal by the digital-to-analogue converter 94 to form an analogue drive signal provided to the LED driver circuit. In the LED driver circuit a drive current flows through the LED 88 to generate an optical power signal. All of the operations described in this paragraph may occur in the time domain.

In this example, the pre-equalization filter is configured to invert the frequency response of the communication channel. However, the filter may be designed with alternative characteristics depending on the communication channel and the communication system characteristics. In the present case, the frequency response of the communication channel is dominated by the frequency response of the LED. A signal is passed through the frequency response filter which inverts the signal before reaching the non-flat communication channel. As a simple example, if the LED is modelled as a low pass filter for modulation frequencies characterised by a frequency response function in the frequency domain (and equivalently by an impulse response in the time domain), then the pre-equalization filter will equal the inverted frequency response function of low pass filter of the LED. In other words, the frequency response is flattened by the pre-equalisation filter.

The form of the pre-equalization filter is characterized by a set of pre-equalization filter coefficients. For different types of LEDs, these coefficients can be pre-determined and stored in a memory of the driving circuitry. For example, they may be stored in a look-up table. Alternatively, for a given type of LED these coefficients can be pre-determined during a system configuration phase. In this phase, the coefficients can be estimated and encoded. Alternatively, pre-determining the coefficients for the filter includes designing the filter in advance and encoding them into the communication protocol.

Pre-determining coefficients involves sending a pilot sequence through the communication channel from the transmitter and receiving the pilot sequence at the receiver. The pilot sequence is the raw information input to the digital modulation encoding module 90 and this is converted to an optical signal to be sent by the LED 98 without the pre-equalisation step. An estimate of channel response or channel state information (CSI) can be determined based on the comparison between the sent pilot sequence and the received pilot sequence. Channel state information is sent back to the transmitter allowing pre-distortion coefficients to be calculated.

As discussed above, pre-determining coefficients can occur during a calibration phase. Alternatively, the filter estimation can occur in real time, and a pilot sequence can be sent together with the actual optical signal. In this way, the system can adapt to environmental changes to the physical communication channel. However, pre-determining coefficients has an increased accuracy with regard to the calculation of coefficients over a real-time estimation, at least at the time the coefficients are calculated.

The channel state information will generally include a metric that can be used to infer performance of the communication channel. For example, the channel state information can include: channel gain/attenuation at different frequencies, channel impulse response and the signal to noise ratio for the carrier or for different subcarriers. The signal to noise ratio of different subcarriers is especially useful when the noise distribution at the receiver is not flat.

The pre-equalization filter can be an implementation of different forms of pre-equalisation including: current shaping, energy loading and adaptive bit and energy loading.

Current shaping involves modifying the drive signal in such a way to take into account the response of the LED. This could be modifying the drive current provided to the LED such that excess current flowing in the drive circuit helps the LED reach its steady state faster. Reverse biasing the LED can also improve switching off times and can be implemented by modifying drive signals. An increased modulation frequency for a given LED can be achieved using this technique.

Energy loading changes energy invested in different parts of the optical signal frequency profile. This energy loading can be combined with the adaptive technique described above. For example, the energy invested in each part of the communication bandwidth can be changed in proportion to the received channel state information in relation to that particular part of the communication bandwidth i.e. different portions of the communication bandwidth can have different sets of channel state information. This is carried out by varying the drive signal in response to the sets of channel state information.

An alternative technique to pre-equalization suitable for optical light communication is adaptive bit and energy loading. This is closely related to the adaptive energy loading technique described above except there is the possibility to change the bits encoded in different portions of the used bandwidth. This is typically applicable to multi-carrier schemes. Like the pre-equalization techniques, adaptive bit and energy loading compensates for a non-flat frequency profile of a communication channel due to a particular type of LED being used.

The pre-equalisation filter 92 can be selected to compensate for the different responses of a wide range of different types of LEDs. A universal choice will result in non-perfect equalisation for some of the types of LED and residual distortion in the signal. However, the frequency response of the analogue filter is designed such that all the types of LEDs provide good. An optional second compensating step can be performed with analogue or digital equalisation at the receiver or alternatively an adaptive digital pre-equalisation filter at the transmitter.

FIG. 6 is a block diagram of an alternative embodiment of signal generating circuitry. This circuitry comprises a digital modulation encoding module 80, a digital-to-analogue converter 82, a pre-equalisation filter 84, a LED driver circuit 86 and a LED 88.

The digital signal output by the digital modulation encoding module 80 is converted to an analogue signal by the digital-to-analogue converter 94. The analogue signal is then filtered using the pre-equalisation filter 84. The pre-equalisation filter 84 in this embodiment may be in the form of a resistor-capacitor-inductor (RCL) circuit.

The output from the pre-equalisation filter is a signal that forms a drive signal for the LED driver circuit 96. In the LED driver circuit 96 a drive current flows through the LED 98 to generate an optical power signal. All of the operations described in this paragraph occur in the time domain in this embodiment.

For practical reasons, the response of the time-domain filter is likely to be of limited length which could introduce imperfections into the pre-equalization procedure. These imperfections can be compensated with an additional secondary compensating step, including additional pre-equalization in the frequency domain and/or with digital or analogue equalization at the receiver.

FIG. 7 is a block diagram of an alternative embodiment of signal generating circuitry. This circuitry comprises a digital modulation encoding module 100, a time to frequency domain converter 102, a pre-equalisation filter 104, a frequency to time domain convertor 106, a digital to analogue convertor 108, a LED driver circuit 110 and a LED 112.

An input information data stream is modulated into a digital signal using any suitable modulation scheme by the digital modulation encoding module 100. In contrast to FIG. 5 and FIG. 6, this digital information signal is converted from the time domain to the frequency domain by the time to frequency domain converter 102. This step might not be required in some embodiments if the modulation procedure starts from the frequency domain as in OFDM. The pre-equalisation filter 84 then filters this digital signal in the frequency domain. The output from the pre-equalisation filter is also a digital signal. The digital signal is converted back into the time domain by the frequency to time domain convertor 106 and then converted to an analogue signal by the digital to analogue convertor 108. The output of the digital to analogue convertor 108 forms an analogue drive signal provided to the LED driver circuit 110. In the LED driver circuit 110 a drive current flows through the LED 112 to generate an optical power signal.

The digital filter of FIG. 7 is entirely implemented in the frequency domain. This filter can be complemented with any number of additional compensating steps. For example, any number of digital/analogue pre-equalization or equalization filters in the time or frequency domain.

FIGS. 5 to 7 show example implementations of pre-equalization in the driver. These examples are illustrative only. An arbitrary number of filtering steps in the frequency and/or time domain can be implemented.

Although embodiments have been described in which pre-equalisation is provided, any suitable pre-coding or pre-distortion component can be provided in place of or as well as the pre-equalisation component. Such components may be used to, for example, correct the distortion effects of the communication channel frequency response and/or in the case of pre-coding to process the data during the digital modulation step such that the time-domain signal distribution becomes more narrow and, hence, less peaky. This, in turn, may allow more signal power to be used during the transmission process without increasing the non-linear distortion of the signal due to the limited operational range of the electronic components and the LED or other light source (values of the signal that drive the LED outside its linear range of operation may be clipped or severely distorted at the least; this may be especially problematic in multicarrier schemes such as OFDM where the peak-to-average power ratio (PAPR) tends to be high relative to single-carrier modulation schemes). The pre-coding (pre-distortion) step can be a transformation on the signal which reduces the peakiness of the distribution and, hence, reduces the PAPR. It can also be a processing step which inverts a non-linear input-output characteristic of an LED or other light source (if such an operation is possible; it is not possible for clipped values, but is possible if the input-output characteristic of the LED is an invertible function). In general, any processing step which conditions the information/modulation signal such that it gets transferred through the LED or other light source with increased communication capacity/information bearing capability, may be provided by the pre-coding component or other compensating means in embodiments.

Conversion from time to frequency domain is carried out using a Fast Fourier Transform (FFT) algorithm implemented in the driving circuitry. Working entirely in the frequency domain is the most straightforward implementation with least complexity and best accuracy. This is available for pre-equalization using multi-carrier modulation schemes such as OFDM. A single-carrier modulation scheme can be pre-equalized by transforming the pre-equalization step in the frequency domain and performing the corresponding time to frequency and frequency to time conversion steps as shown in FIG. 7. A FFT transform implementation may be too costly. In this case, a sole time-domain implementation might be used or a combination of a lower complexity FFT and a time-domain filtering operation can be considered.

In combination with the compensating means, all different types of LEDs or other light sources connected to the luminaire will have proper biasing and flat frequency responses. The only difference between the different types of LED or other light sources, once connected, is the output optical power that is generated by the LED or other light source. Returning to FIG. 3, it can be seen that the luminaire is configured to be connected to one or more LEDs. While FIG. 3 shows two LEDs connected in series, they can also be connected in parallel. Connecting multiple LEDs to the same driving circuit will lead to an increased output optical power of the luminaire to produce a more powerful optical signal. Hence an increased signal to noise ratio can be achieved by the device and the communication system.

Although embodiments have been described in relation to LEDs and associated driving circuitry, any other suitable light sources as well as or instead of LEDs may be used in alternative embodiments. For example laser diode (LD) light sources may be used in as well as or instead of LEDs. The LEDs or other light sources may emit visible light or light at any other appropriate frequency or frequency range. The light and/or optical signals may comprise electromagnetic waves with wavelengths in the range 1 nm to 2500 nm. The light and/or optical signals may comprise ultraviolet, visible light, near-infrared light or THz radiation.

A skilled person will appreciate that variations of the disclosed arrangements are possible without departing from the invention. For example, FIG. 3 shows a simple driver circuit, however, the invention can be easily extended to different implementations of driver circuit. For example, a driver circuit can be used wherein an AC-coupled amplifier configuration where the transistor gate voltage is decoupled from the information signal via a capacitor and the DC component of the transistor gate voltage is set by using a secondary voltage biasing circuit. Also, the digital embodiment of the voltage-controlled DC supply circuit could equally be implemented as an analogue only or a combination of digital and analogue components that provide the same functionality. Likewise, a particular transistor MOSFET is shown, however other well-known transistor technologies or amplifier circuits exist, the implementation of which may necessitate modification of the circuit. Furthermore, more than one LED circuit line can be implemented and the driving circuit can be adapted to allow more than one different type of LED to be connected to the same luminaire and to be provided with the same drive signal. Accordingly, the above description of the specific embodiment is made by way of example only and not for the purposes of limitation. It will be clear to the skilled person that straightforward modifications may be made without significant changes to the operation described.

The invention claimed is:

1. An optical wireless communication (OWC) luminaire driver apparatus configured to use with one or more light emitting diodes or other light sources, the OWC luminaire driver apparatus comprising:
   voltage control circuitry configured to regulate a supply voltage to the one or more light emitting diodes or other light sources; and
   driving circuitry configured to provide a drive current to the one or more light emitting diodes or other light sources,
   wherein the driving circuitry is configured to modulate the drive current based on a drive signal,
   wherein the voltage control circuitry is configured to regulate the supply voltage based on a type of the one or more light emitting diodes or other light sources thereby to adapt to different types of the light emitting diodes (LEDs) or other light sources,
   wherein the drive signal is modulated and comprises a DC component and an AC component,
   wherein the DC component sets an operating point of the one or more light emitting diodes or other light sources, and
   wherein the AC component corresponds to the drive current that has been modulated and provided to the one or more light emitting diodes or other light sources.

2. The OWC luminaire driver apparatus of claim 1, wherein the drive current is dependent on the supply voltage.

3. The OWC luminaire driver apparatus of claim 1, wherein the driving circuitry comprises:
   a light emitting diode circuit module configured to power the one or more light emitting diodes or other light sources; and
   a signal circuit module configured to provide the drive signal to the light emitting diode circuit module to modulate the drive current.

4. The OWC luminaire driver apparatus of claim 3, wherein different voltage levels are provided to the light emitting diode circuit module and the signal circuit module.

5. The OWC luminaire driver apparatus of claim 1, wherein the different types of light emitting diodes or other light sources comprise light emitting diodes or other light sources that have at least one of different minimum and/or maximum operating current and/or voltage levels, different modulation frequency bandwidths, or different optical response to input current.

6. The OWC luminaire driver apparatus of claim 1, wherein the control circuitry comprises a monitor configured to monitor a parameter of the driving circuitry, and wherein the parameter is representative of the operation of the one or more light emitting diodes or other light sources.

7. The OWC luminaire driver apparatus of claim 6, wherein the control circuitry is further configured to automatically adjust the supply voltage to the one or more light emitting diodes or other light sources based on the monitored parameter.

8. The OWC luminaire driver apparatus of claim 7,
   wherein the drive signal that has been modulated modulates the drive current to produce a value within a range of values, and/or
   wherein the supply voltage that has been automatically adjusted operates the one or more light emitting diodes or other light sources over the range of values.

9. The OWC luminaire driver apparatus of claim 8, wherein the supply voltage is selected to operate the one or more light emitting diodes or other light sources in a linear region of an optical power output to current input curve of the one or more light emitting diodes or other light sources.

10. The OWC luminaire driver apparatus of claim 7, wherein the supply voltage that has been automatically adjusted is provided to the one or more light emitting diodes or other light sources to maintain the monitored parameter at a predetermined value, within a predetermined range, or at a minimum value, thereby reducing power consumption of components of the driving circuitry.

11. The OWC luminaire driver apparatus of claim 6,
   wherein the driving circuitry comprises a transistor, a current regulating component, and/or a voltage regulating component,
   wherein the transistor, the current regulating component, and/or the voltage regulating component is configured to control the drive current using the drive signal, and
   wherein the monitored parameter of the driving circuitry is representative of or dependent on an input voltage, an output voltage, an input current, or an output current of the transistor, the current regulating component, and/or the voltage regulating component.

12. The OWC luminaire driver apparatus of claim 11, wherein the monitored parameter is maintained at a predetermined value, within a predetermined range, or at the minimum value thereby reducing voltage drop across the transistor.

13. The OWC luminaire driver apparatus of claim 1, wherein the driving circuitry comprises:
compensating circuitry configured to at least partially reduce distortion to the optical wireless communication signal produced by the one or more light emitting diodes or other light sources.

14. The OWC luminaire driver apparatus of claim 13, wherein the compensating circuitry is further configured to at least partially reduce a contribution to the distortion to the optical wireless communication signal from a response of the one or more light emitting diodes or other light sources to the drive signal.

15. The OWC luminaire driver apparatus of claim 13,
wherein the optical wireless communication signal is transmitted through a free-space communication channel to a receiver, and
wherein the compensating circuitry is further configured to at least partially reduce a contribution to the distortion to the optical wireless communication signal from the free-space communication channel.

16. The OWC luminaire driver apparatus of claim 13,
wherein the distortion of the optical wireless communication signal is represented by a deformation in a shape of the optical wireless communication signal, and
wherein the compensating circuitry is configured to manipulate the drive signal to at least partially reduce the deformation in the shape of the optical wireless communication signal.

17. The OWC luminaire driver apparatus of claim 13, wherein the compensating circuitry comprises pre-equalisation circuitry, pre-coding circuitry, or pre-distortion circuitry.

18. The OWC luminaire driver apparatus of claim 17, wherein the pre-equalisation circuitry, pre-coding circuitry, or pre-distortion circuitry is configured to invert a nonlinear input-output characteristic of at least one of the light emitting diodes or other light sources.

19. The OWC luminaire driver apparatus of claim 17, wherein at least one further compensation procedure is performed to provide at least one of analog or digital equalization at a receiver or adaptive pre-equalization filtering at the driver apparatus.

20. The OWC luminaire driver apparatus of claim 13, wherein the compensating circuitry comprises circuitry configured to carry out adaptive bit and/or energy loading.

21. The OWC luminaire driver apparatus of claim 20, wherein the compensating circuitry comprises one or more digital and/or analog filters.

22. The OWC luminaire driver apparatus of claim 21, wherein filter coefficients of the one or more digital and/or analog filters have pre-determined values.

23. The OWC luminaire driver apparatus of claim 21, wherein at least one of the one or more digital and/or analog filters is configured to receive the optical wireless communication signal based on channel state information.

24. The OWC luminaire driver apparatus of claim 21 wherein filter coefficients of the one or more filters are determined based on one or more of:
pre-determining the filter coefficients by sending a pilot sequence through a communication channel and receiving the pilot sequence at a receiver, and determining an estimate of channel response or channel state information based on a comparison between the pilot sequence that was sent and the pilot sequence at the receiver,
determining the filter coefficients during a calibration phase or in real-time, or
determining the filter coefficients by sending a pilot signal together with, or as part of, the optical wireless communication signal.

25. The OWC luminaire driver apparatus of claim 13, wherein the compensating circuitry is configured to operate in a frequency domain or in a time domain.

26. The luminaire driver apparatus of claim 1, wherein the different types of LEDs comprise at least one of phosphor converted LED, multi-chip LED, micro LED or resonant cavity LED, or the drive signal is modulated using at least one of a single carrier modulation scheme, a multi-carrier modulation scheme or a carrier-less modulation scheme.

27. An apparatus comprising at least one light source, the OWC luminaire driver apparatus according to claim 1, and a power source providing a supply voltage and/or the drive current.

28. A method of operating at least one light source in a OWC an optical wireless communication (OWC) luminaire driver apparatus to provide optical wireless communication, the method comprising:
regulating by voltage control circuitry a supply voltage to the one or more light emitting diodes or other light sources;
providing by driving circuitry a drive current to the one or more light emitting diodes or other light sources; and
modulating by the driving circuitry the drive current based on a drive signal representing data,
wherein the voltage control circuitry is configured to regulate the supply voltage based on a type of said one or more light emitting diodes or other light sources thereby to adapt to different types of the light emitting diodes (LEDs) or other light sources,
wherein the drive signal is modulated and comprises a DC component and an AC component,
wherein the DC component sets an operating point of the one or more light emitting diodes or other light sources, and
wherein the AC component corresponds to the drive current that has been modulated and provided to the one or more light emitting diodes or other light sources.

* * * * *

UNITED STATES PATENT AND TRADEMARK OFFICE
CERTIFICATE OF CORRECTION

PATENT NO. : 10,736,201 B2  
APPLICATION NO. : 16/084405  
DATED : August 4, 2020  
INVENTOR(S) : Burchardt et al.

Page 1 of 1

It is certified that error appears in the above-identified patent and that said Letters Patent is hereby corrected as shown below:

In the Claims

Column 16, Lines 34-35, Claim 28:
Delete "source in a OWC an optical" and insert -- source in an optical --

Signed and Sealed this  
Fifth Day of January, 2021

Andrei Iancu  
*Director of the United States Patent and Trademark Office*